May 28, 1935. K. STROBEL 2,003,020
WELDING ROD FOR APPLYING PROTECTIVE ABRASION RESISTING FACINGS
Filed Sept. 16, 1930
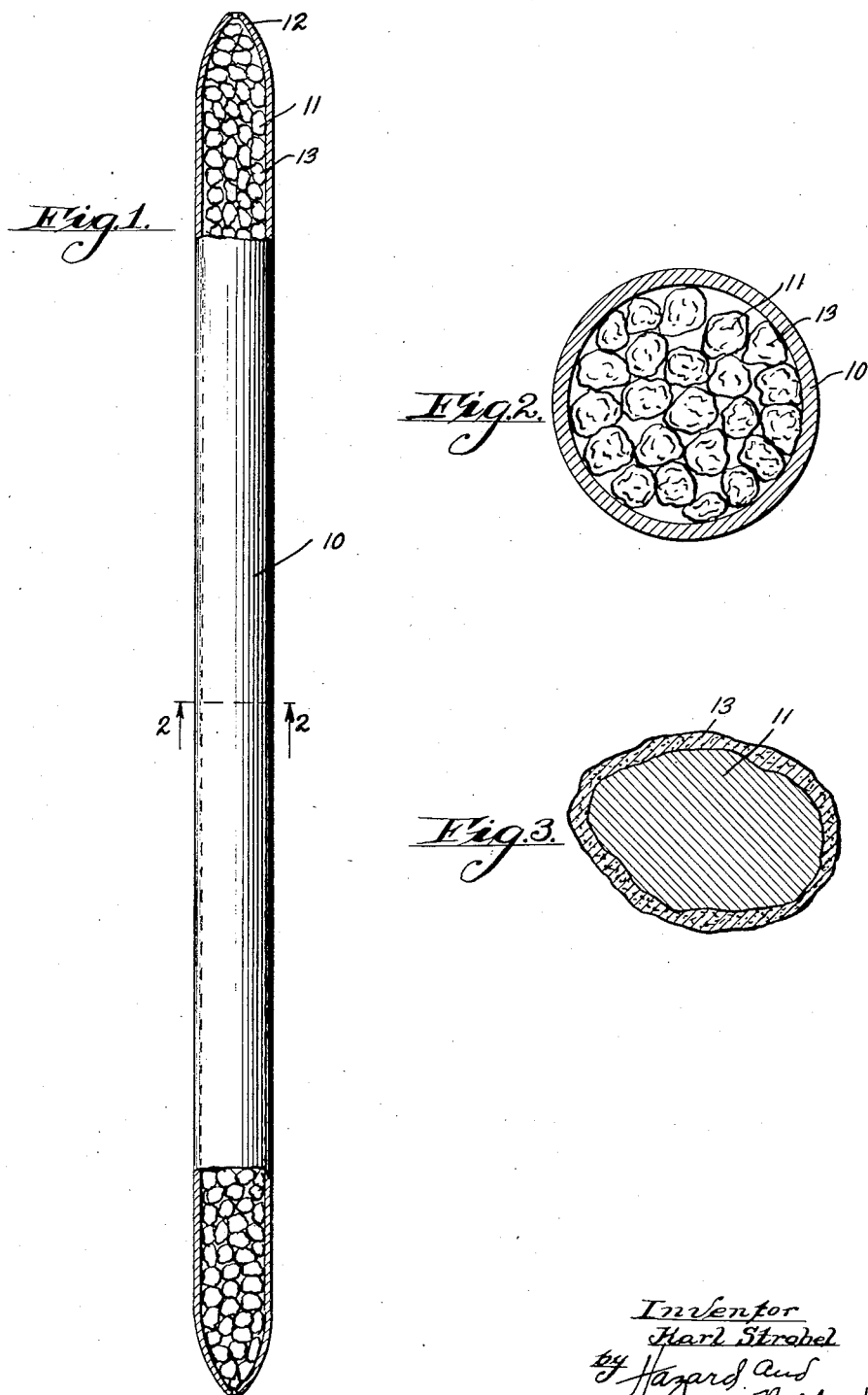

Patented May 28, 1935

2,003,020

UNITED STATES PATENT OFFICE 2,003,020

WELDING ROD FOR APPLYING PROTECTIVE ABRASION RESISTING FACINGS

Karl Strobel, Whittier, Calif., assignor to Stoody Company, Whittier, Calif., a corporation of California Application September 16, 1930, Serial No. 482,271

15 Claims. (Cl. 219—8)

This invention relates to a welding rod for applying protective abrasion resisting facings and may be considered an improvement over the patent issued to Winston F. Stoody, Shelley M. Stoody and Norman W. Cole, No. 1,757,601, issued May 6, 1930.

An object of the present invention is to provide an improved welding rod for applying protective abrasion resisting facings which can be employed using an electric arc as the welding medium as well as an acetylene torch. In the prior patent above referred to, the welding rod consists of a tubular container filled with a mass of tungsten carbide fragments or particles. This welding rod is applied to a surface to be protected by melting it down with an acetylene torch, depositing the steel of the container and the tungsten carbide particles simultaneously on the surface. In using this form of welding rod care must be taken to have the flame of the acetylene torch a strictly neutral flame for if an oxidizing flame is used not only will the steel of the container be oxidized but the tungsten carbide particles will likewise be oxidized. The tungstic oxide formed has the effect of poisoning the steel of the container which anchors the particles in place. If the welding rod disclosed in the prior patent is melted with an electric arc, not only is the tungstic oxide formed but the particles themselves melt slowly and if the arc is prolonged they will completely melt and mix with the steel of the container so that there are no longer any abrasion resisting hard particles having a hardness approaching that of a black diamond embedded in the steel.

By the improved welding rod wherein the individual particles of diamond substitute such as an alloy consisting principally of tungsten carbide are coated with a flux coating designed to retard melting of the tungsten carbide, it is possible to weld on the deposit with an electric arc without danger of melting the particles and without danger of forming the metal poisoning tungstic oxide.

Another object of the invention is to provide an improved welding rod consisting of a steel container filled with particles of diamond substitute having a protective flux coating which is of such a nature that as the welding rod is melted the flux coating prevents the oxidation of the diamond substitute and acts somewhat as an insulator, protecting the particles from the intense heat of the electric arc. The flux coating may be of such a nature that it acts upon the steel of the container also to form a steel of greater hardness than originally.

With the foregoing and other objects in view, which will be made manifest in the following detailed description, and specifically pointed out in the appended claims, reference is had to the accompanying drawing for an illustrative embodiment of the invention, wherein:

Fig. 1 is a view in side elevation, parts being broken away and shown in vertical section, illustrating the improved welding rod.

Fig. 2 is a horizontal section taken upon the line 2—2 upon Figure 1.

Fig. 3 is a sectional view, on an enlarged scale, of one of the fragments or particles of diamond substitute within the container.

Referring to the accompanying drawing wherein similar reference characters designate similar parts throughout, the improved welding rod consists of a tubular container 10, preferably formed of mild steel although other substances may be employed. The container is filled with pieces or fragments of diamond substitute 11 which in the preferred form of construction are an alloy consisting principally of tungsten carbide. It will be appreciated, however, that the invention is not restricted to the use of tungsten carbide or tungsten carbide alloys but other forms of diamond substitute may be employed. The ends of the tube 10 are pinched together, or otherwise closed, as at 12 to keep the particles within the container.

The individual particles of diamond substitute are each coated with a flux coating indicated at 13. This flux coating serves to prevent the particles 11 from being oxidized during the welding operation. It also acts somewhat as a heat insulator delaying the heating of the particles 11 so that they will not be melted under the intense heat of the electric arc. At the same time the flux coating is so designed that it will float and form a slag upon the molten steel of container 10 surrounding the particles so that it does not form a layer which remains about the particles to prevent a strong adhesive bond being formed between the steel and the surfaces of the particles. Any form of flux coating which will accomplish these results may be employed. One form of flux coating which I find to give advantageous results consists of a mixture of about twenty-five percent lamp black or free carbon and seventy-five percent calcium fluoride, these ingredients being held together by a sodium silicate binder. A metallic flux coating for the individual particles may be used equally well and give results which compare favorably with the non-metallic flux coating as above described. As an example of a metallic flux coating a mixture of 15% nickel and 85% iron will prove satisfactory. The flux in all instances should have a melting point above that of mild steel and should closely approach the melting point of the particles.

By the improved construction the welding rod may be used to apply protective facings employing either an acetylene torch or an electric arc. The improved welding rod can also be advantageously used with an atomic hydrogen torch. Regardless of the particular manner of application oxidation of the tungsten carbide is effectively prevented. Also the melting of the particles under the intense heat is prevented. As the welding rod is deposited, the flux coating floats on top of the steel forming a slag and does not poison the surrounding metal and as the particles do not have a film of oxide formed thereon the adhesive bond between the steel and the tungsten carbide, or other diamond substitute, will be the strongest.

A peculiar result developed from the above described construction resides in the fact that where the flux coating contains calcium fluoride I find that when the coated particles are confined within the container 10 the calcium fluoride and other gases (probably calcium carbide) apparently advantageously affects the steel in that the steel on being melted will become much harder. Thus if the container 10 is formed of a medium carbon steel, after the deposit the steel between the fragments of diamond substitute has its hardness materially increased so that by the improved construction the hard particles will be anchored in place on the surface to be protected by a hard steel which strongly adheres to the particles.

The deposit thus made on the surface may or may not be hard surfaced over with a hard surfacing material.

From the above described construction it will be appreciated that a novel and advantageous welding rod is provided which can be used either with an acetylene torch, an electric arc, or an atomic hydrogen torch. The particles of diamond substitute are kept from being melted even under the heat of the electric arc and the formation of the oxide on the particles is effectively prevented.

Various changes may be made in the details of construction without departing from the spirit or scope of the invention as defined by the appended claims.

I claim:

1. A welding rod for applying protective facings comprising a mass of diamond substitute particles, each particle having a protective flux coating designed to retard melting of the particle, said particles being held together in rod like form by a fusible metal.

2. A welding rod for applying protective facings comprising a mass of diamond substitute particles, each particle having a protective flux coating designed to retard melting of the particle, and a metal of lower melting point than that of the diamond substitute holding the particles in rod like form.

3. A welding rod for applying protective facings comprising a tubular container, and diamond substitute particles in the container each having a flux coating designed to retard melting of the particle.

4. A welding rod for applying protective facings comprising a tubular container, and diamond substitute particles in the container each having a flux coating designed to retard melting of the particles containing a substantial amount of free carbon.

5. A welding rod for applying protective facings comprising a tubular container, and diamond substitute particles in the container each having a flux coating designed to retard melting of the particle containing a substantial amount of calcium fluoride.

6. A welding rod for applying protective facings comprising a tubular container, and diamond substitute particles in the container each having a flux coating designed to retard melting of the particle containing substantial amounts of free carbon and calcium fluoride.

7. A welding rod for applying protective tungsten carbide facings comprising a mass of tungsten carbide particles, each particle having a protective flux coating designed to retard melting of the particle, and a metal of lower melting point than that of the tungsten carbide holding the particles in rod like form.

8. A welding rod for applying protective tungsten carbide facings comprising a tubular container and tungsten carbide particles in the container, each having a flux coating designed to retard melting of the particle.

9. A welding rod for applying protective tungsten carbide facings comprising a tubular container and tungsten carbide particles in the container, each having a flux coating designed to retard melting of the particle containing a substantial amount of free carbon.

10. A welding rod for applying protective tungsten carbide facings comprising a tubular container and tungsten carbide particles, each having a flux coating designed to retard melting of the particle containing a substantial amount of calcium fluoride.

11. A welding rod for applying protective tungsten carbide facings comprising a tubular container and tungsten carbide particles, each having a flux coating designed to retard melting of the particle containing substantial amounts of free carbon and calcium fluoride.

12. A welding rod for applying protective tungsten carbide facings comprising a tubular container and tungsten carbide particles, each particle having a protective flux coating, designed to retard melting of the particle, said particles being held together in rod like form by a fusible metal.

13. A welding rod primarily designed for applying protective facings using the electric arc process comprising a steel tubular container filled with particles of tungsten carbide, each particle having a temporary heat resisting coating applied thereto which delays heating of the tungsten carbide.

14. A welding rod primarily designed for applying protective facings using the electric arc process comprising a steel tubular container filled with particles of tungsten carbide, each particle having a temporary heat resisting coating applied thereto which delays heating of the tungsten carbide comprising approximately 25 percent free carbon, 75 percent calcium fluoride, and a binder.

15. A welding rod primarily designed for applying protective abrasive facings using the electric arc process comprising a steel tubular container filled with particles of tungsten carbide, each particle having a temporary heat resisting coating applied thereto which delays heating of the tungsten carbide comprising approximately 15 percent nickel and 85 percent iron.

KARL STROBEL.